United States Patent
Jang et al.

(10) Patent No.: US 9,065,083 B2
(45) Date of Patent: Jun. 23, 2015

(54) LITHIUM POLYMER BATTERY

(75) Inventors: Youngcheol Jang, Yongin-si (KR); Eunok Kwak, Yongin-si (KR)

(73) Assignee: SAMSUNG SDI CO., LTD., Suwon-Si, Gyeonggi-do (KR)

( * ) Notice: Subject to any disclaimer, the term of this patent is extended or adjusted under 35 U.S.C. 154(b) by 729 days.

(21) Appl. No.: 12/436,054

(22) Filed: May 5, 2009

(65) Prior Publication Data

US 2009/0297942 A1     Dec. 3, 2009

(30) Foreign Application Priority Data

Jun. 3, 2008 (KR) ........................ 10-2008-0052271

(51) Int. Cl.
| | |
|---|---|
| H01M 2/30 | (2006.01) |
| H01M 2/06 | (2006.01) |
| H01M 2/00 | (2006.01) |
| H01M 4/13 | (2010.01) |
| H01M 2/02 | (2006.01) |
| H01M 2/22 | (2006.01) |
| H01M 10/42 | (2006.01) |
| H01M 10/052 | (2010.01) |
| H01M 10/0565 | (2010.01) |

(52) U.S. Cl.
CPC ............ *H01M 2/021* (2013.01); *H01M 2/0217* (2013.01); *H01M 2/22* (2013.01); *H01M 10/052* (2013.01); *H01M 10/0565* (2013.01); *H01M 10/42* (2013.01); *H01M 10/425* (2013.01)

(58) Field of Classification Search
CPC ......... H01M 2/30; H01M 2/06; H01M 2/305; H01M 2/20; H01M 10/0587; H01M 10/052

USPC .............................. 429/178, 246, 231.95, 211
See application file for complete search history.

(56) References Cited

U.S. PATENT DOCUMENTS

| | | | |
|---|---|---|---|
| 5,498,490 A * | 3/1996 | Brodd ........................... | 429/149 |
| 8,617,729 B2 * | 12/2013 | Heo .................................. | 429/7 |
| 2001/0038938 A1 * | 11/2001 | Takahashi et al. .............. | 429/53 |
| 2002/0034680 A1 | 3/2002 | Inoue et al. | |
| 2003/0027040 A1 | 2/2003 | Asahina et al. | |
| 2006/0105237 A1 * | 5/2006 | Oh ................................. | 429/180 |
| 2006/0127759 A1 | 6/2006 | Bechtold et al. | |

(Continued)

FOREIGN PATENT DOCUMENTS

| | | |
|---|---|---|
| JP | 2000-331717 | 11/2000 |
| JP | 2002-352789 | 12/2002 |

(Continued)

*Primary Examiner* — Barbara Gilliam
*Assistant Examiner* — Angela Martin
(74) *Attorney, Agent, or Firm* — Knobbe Martens Olson & Bear LLP

(57) ABSTRACT

Disclosed is a lithium polymer battery, which includes: an electrode assembly; an outer case receiving the electrode assembly, where an electrode tab of the electrode assembly is withdrawn out of the outer case; a protection circuit module provided at one side of the outer case, where an inner connection terminal of the protection circuit module is connected to the electrode tab of the electrode assembly and provided in parallel to the withdrawn direction of the electrode tab. The lithium polymer battery can improve reliability and safety of an electrical coupling state between a bare cell and a protection circuit module and assembling workability between the electrode tab and connection terminals by mechanically and electrically coupling them to each other without bending the electrode tab.

10 Claims, 7 Drawing Sheets

(56) References Cited

U.S. PATENT DOCUMENTS

| | | |
|---|---|---|
| 2006/0214632 A1 | 9/2006 | Lee et al. |
| 2006/0266542 A1 | 11/2006 | Yoon |
| 2008/0220316 A1 | 9/2008 | Berkowitz et al. |
| 2009/0246615 A1 | 10/2009 | Park |
| 2009/0317712 A1 | 12/2009 | Kim et al. |
| 2012/0141872 A1* | 6/2012 | Kim et al. ............ 429/219 |

FOREIGN PATENT DOCUMENTS

| | | | | |
|---|---|---|---|---|
| JP | 2004-022363 | | 1/2004 | |
| JP | 2004-303618 | | 10/2004 | |
| JP | 2005-149909 | | 6/2005 | |
| JP | 2006-040775 | | 2/2006 | |
| JP | 2006-073457 | * | 3/2006 | ............ H01M 2/10 |
| KR | 1020050122682 | | 12/2005 | |
| KR | 1020060103030 | * | 9/2006 | ............ H01M 2/10 |
| KR | 1020060112393 | | 11/2006 | |
| KR | 1020060113802 | | 11/2006 | |
| KR | 1020060113802 | * | 2/2007 | ............ H01M 2/10 |
| KR | 1020070033834 | * | 3/2007 | ............ H01M 2/10 |
| KR | 1020070042033 | | 4/2007 | |
| KR | 1020070097151 | * | 4/2007 | ............ H01M 2/10 |
| KR | 1020070097151 | | 10/2007 | |

* cited by examiner

LITHIUM POLYMER BATTERY

CLAIM FOR PRIORITY

This application is based on and claims priority to Korean Patent Application No. 10-2008-0052271, filed on Jun. 3, 2008, in the Korean Intellectual Property Office (KIPO), the entire contents of which are hereby incorporated by reference.

BACKGROUND

1. Field of the Invention

The present invention relates to a lithium polymer battery, and more particularly, to a lithium polymer battery that can improve reliability, safety and mechanical assembling workability of an electrical coupling structure between a bare cell and a protection circuit module.

2. Description of the Related Art

Generally, a lithium polymer battery includes, in one implementation, an electrode assembly, a pouch type outer case receiving the electrode assembly and a core pack formed of a protection circuit module that is provided at one side of the outer case so as to be electrically coupled to the electrode assembly.

The electrode assembly is formed by interposing a separator between first and second electrode plates and winding them together in a jelly-roll type. Electrode tabs are respectively attached to the first and second electrode plates and withdrawn out of the front of the outer case by a predetermined length.

The outer case, in one implementation, is a flexible pouch type and both sides and front thereof are thermally bonded. When the outer case is thermally bonded, remaining parts of a predetermined length are formed to protect the electrode assembly contained in the outer case. Accordingly, the remaining parts formed at both sides of the outer case are folded to surround the electrode assembly, thereby reducing a width of the battery. Then, the protection circuit module is placed on the remaining part formed on the front of the outer case.

However, in the conventional lithium polymer battery, a process of bending the electrode tabs is unavoidably performed while the protection circuit module is mechanically and electrically coupled to the electrode tabs withdrawn out of the front of the outer case.

For example, the electrode tabs may be bent to weld the connection terminal of the protection circuit module and electrode tabs at the same welding point. Or, when the connection terminal of the protection circuit module and electrode tabs are welded without bending the electrode tabs, the electrode tabs should be bent after welding. That is the reason that the process of bending the electrode tab should be performed to expose the external terminal of the protection circuit module.

As described above, the complicated process of bending the electrode tab has been unavoidably performed at least once while the outer case and protection circuit module are assembled.

Accordingly, the conventional lithium polymer battery has a problem that wire disconnection occurs at the bent part of the electrode tab and the reliability and safety of the battery are degraded.

In addition, assembling workability is lowered because of the complicated process to bend the electrode tab.

SUMMARY

Accordingly, an object of the present invention is to provide a lithium polymer battery that can improve reliability and safety of the battery by electrically coupling an electrode tab to a protection circuit module with reduced bending of the electrode tab.

According to another object of the present invention, there is to provide a lithium polymer battery that can improve assembling work by electrically coupling an electrode tab to a protection circuit module with reduced bending of the electrode tab.

Additional advantages, objects and features of the invention will be set forth in part in the description which follows and in part will become apparent to those having ordinary skill in the art upon examination of the following or may be learned from practice of the invention.

According to an aspect of the present invention, there is provided a lithium polymer battery, which includes: an electrode assembly; an outer case receiving the electrode assembly, where an electrode tab of the electrode assembly is withdrawn out of the outer case; a protection circuit module provided at one side of the outer case, where an inner connection terminal of the protection circuit module is connected to the electrode tab of the electrode assembly and provided in parallel to the withdrawn direction of the electrode tab.

The electrode assembly may be formed by interposing a separator between first and second electrode plates and winding them together in a jelly-roll type. Electrode tabs may be respectively attached to the first and second electrode plates.

The outer case may include a first region for receiving the electrode assembly and a second region combined to an open part of the first region, where right and left sides and the fronts of the first and second regions are thermally bonded so as to form side remaining parts and front remaining parts.

The electrode tab may be vertically withdrawn out through the front remaining part of the outer case and the protection circuit module may be provided at the front remaining part of the outer case.

The protection circuit module may include a circuit board provided with the inner and outer connection terminals, where the inner connection terminal is electrically and mechanically connected to the electrode tab and the outer connection terminal transmits current to the outside by being electrically coupled to the inner connection terminal.

The inner and outer connection terminals may be respectively provided at different surfaces of the circuit board.

In this time, the outer connection terminal may be provided on the front surface of the circuit board and the inner connection terminal may be provided on a long side surface adjacent to the front surface.

The protection circuit module may include the circuit board and a terminal housing separated from the circuit board and the inner connection terminal may be provided on the circuit board and the outer connection terminal electrically coupled to the inner connection terminal may be provided at the terminal housing.

The circuit board may be provided at the front remaining part of the outer case in a stood-up state and the terminal housing may be provided at the long side surface of the circuit board.

The inner connection terminal may be provided at the front surface of the circuit board.

In yet another aspect, the invention may comprise a battery assembly comprising an electrode assembly comprising a first electrode and a second electrode with a separator interposed therebetween. The electrode assembly has a first and a second lateral side and the electrode assembly further includes at least one electrode tab that is coupled to at least one of the first and second electrodes at a first lateral side of the electrode assembly so as to extend outward therefrom in a first direction.

The battery assembly further comprises a casing that defines a first recess with an opening, wherein the recess is sized so as to receive the electrode assembly so that the at least one electrode tab extends outward from the opening in the first direction. The casing further includes a cover that covers the opening so as to secure the electrode assembly within the first recess with the at least one electrode tab extending between the cover and the casing. The casing defines a mounting location located on a first surface of the casing that is located in the first direction from the first recess.

The battery assembly further comprises a protection circuit module that is mounted on the mounting location on the casing. The protection circuit module includes at least one terminal that is positioned to be substantially aligned with the at least one electrode tab of the electrode assembly so that the at least one electrode tab of the electrode assembly is positioned proximate to the at least one terminal of the protection circuit module to permit interconnection thereof.

In yet another aspect, the battery assembly casing includes flanged surfaces that extend around the opening to the first recess. The cover is pivotally attached to a first side of the opening of the casing so that the cover closes about the opening with the at least one electrode tab being interposed between the cover and a flanged surface that is located in a first direction from the opening to the first recess.

In yet another aspect, the recess in the casing extends in a second direction, perpendicular to the first direction, a distance sufficient to accommodate the width of the electrode assembly such that the at least one electrode tab is positioned outside of the first recess adjacent the flanged surface that is located in a first direction from the opening in the first recess.

In yet another aspect, the at least one terminal of the protection circuit module is mounted on a first surface of the protection circuit module and the protection circuit module is mounted on the first surface of the casing at the mounting location so that the at least one terminal of the protection circuit module is positioned in substantially the same plane as the at least one electrode tab so that the at least one electrode tab of the electrode assembly can be coupled to the at least one electrode on the protection circuit module.

In yet another aspect, the protection circuit module is positioned on the first surface so that the at least one electrode tab can be coupled to the at least one terminal on the protection circuit module without bending the at least one electrode tab.

BRIEF DESCRIPTION OF THE DRAWINGS

The above and other objects, features and advantages of the present invention will be more apparent from the following detailed description taken in conjunction with the accompanying drawing, in which.

DETAILED DESCRIPTION OF EXEMPLARY EMBODIMENTS

Figure 1:
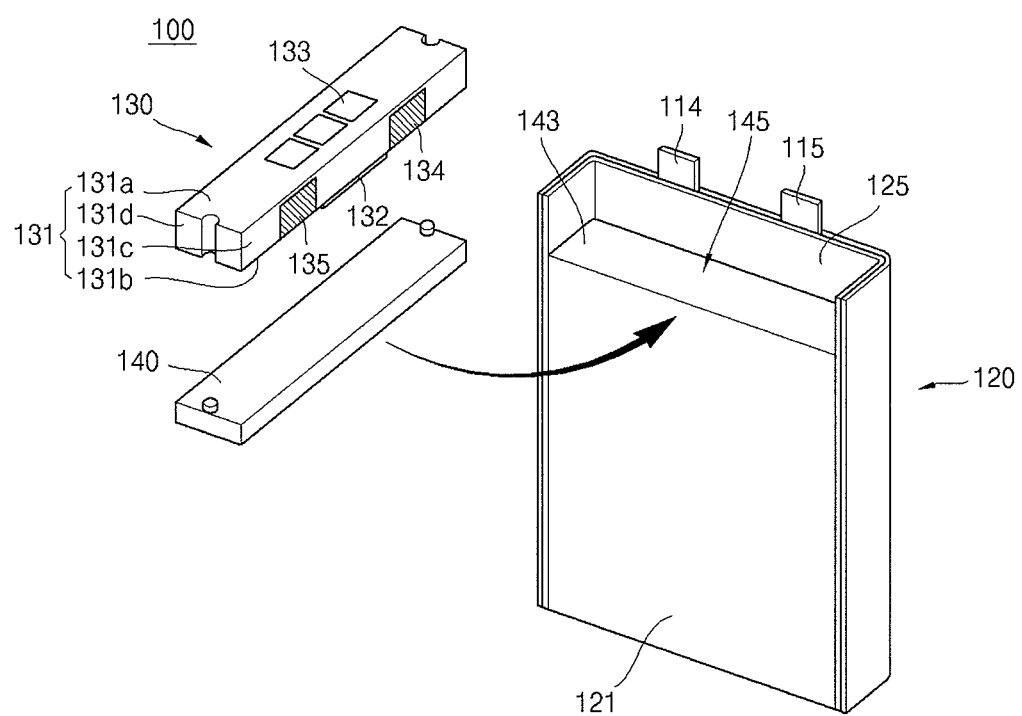
FIG. 1 is an exploded perspective view illustrating a lithium polymer battery according to one exemplary embodiment of the present invention.

Hereinafter, preferred embodiments of the present invention will be described in detail with reference to the accompanying drawing. The aspects and features of the present invention and methods for achieving the aspects and features will be apparent by referring to the embodiments to be described in detail with reference to the accompanying drawings. However, the present invention is not limited to the embodiments disclosed hereinafter, but can be implemented in diverse forms. The matters defined in the description, such as the detailed construction and members, are nothing but specific details provided to assist those of ordinary skill in the art in a comprehensive understanding of the invention, and the present invention is only defined within the scope of the appended claims. In the entire description of the present invention, the same drawing reference numerals are used for the same members across various figures.

Figure 2:
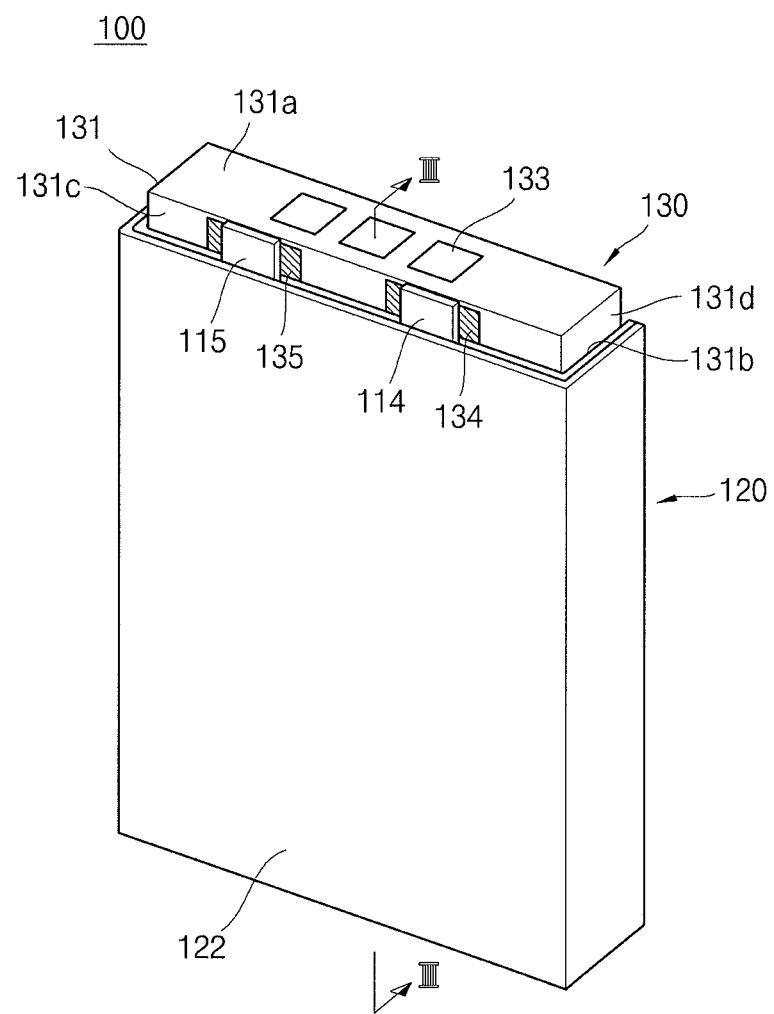
FIG. 2 is a perspective view illustrating an assembled state of the lithium polymer battery.
Figure 3:
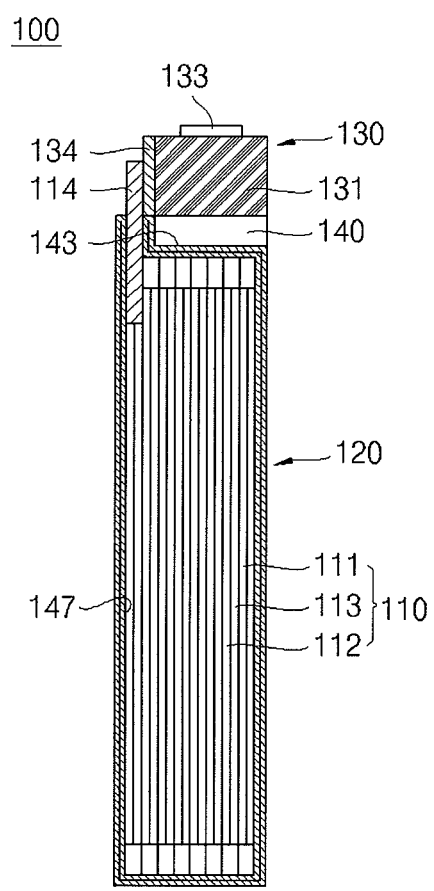
FIG. 3 is a sectional view taken along 'III-III' line of FIG. 2.
Figure 4:
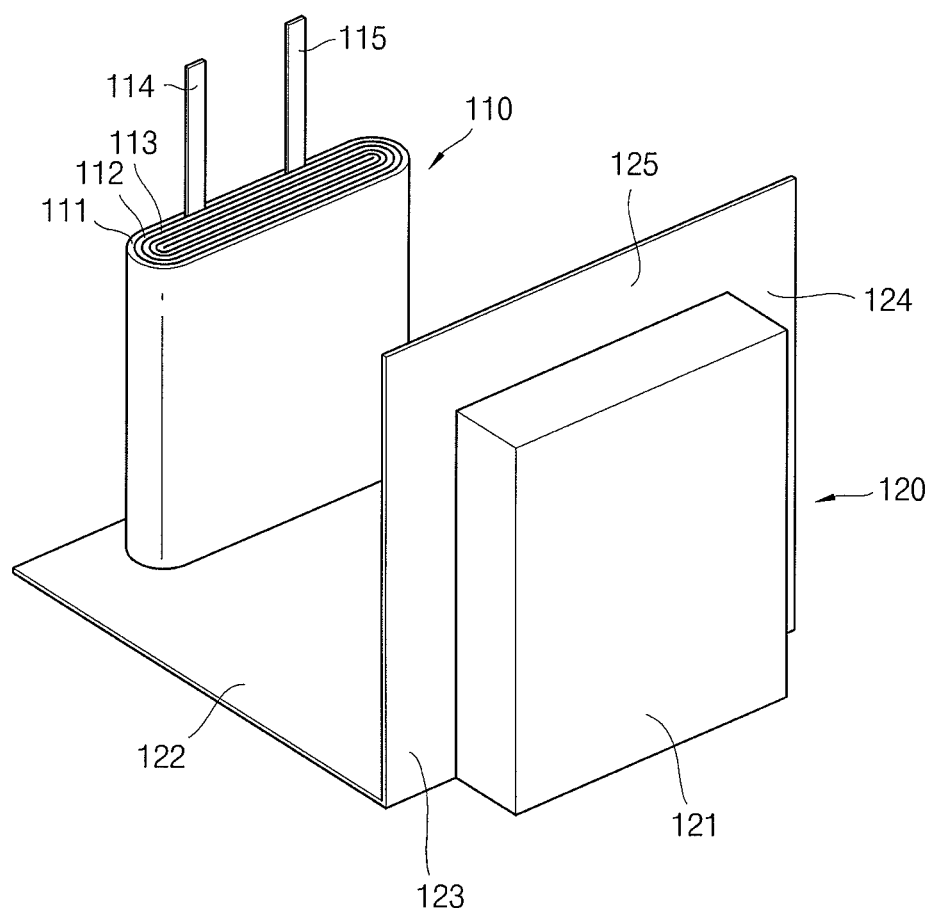
FIG. 4 is a perspective view illustrating a combined state of an electrode assembly and an outer case according to the present invention.

FIG. 1 is an exploded perspective view illustrating a lithium polymer battery according to one exemplary embodiment of the present invention and FIG. 2 is a perspective view illustrating an assembled state of the lithium polymer battery and FIG. 3 is a sectional view taken along 'III-III' line of FIG. 2 and FIG. 4 is a perspective view illustrating a combined state of an electrode assembly and an outer case according to the present invention.

Referring to FIGS. 1 to 4, a lithium polymer battery 100 includes an electrode assembly 110, a roughly cubic outer case 120 receiving the electrode assembly 110 and a protection circuit module 130 electrically coupled to the electrode assembly 110 in the outer case 120. In addition, the lithium polymer battery 100 further includes a substrate holder 140.

The protection circuit module 130 includes a circuit board 131 and the circuit board 131 includes an outer connection terminal 133 and first and second inner connection terminals 134 and 135. The first and second inner connection terminals 134 and 135 are provided in parallel to the withdrawn direction of first and second electrode tabs 114 and 115 of the outer case 120.

The outer connection terminal 133 and first and second inner connection terminals 134 and 135 are respectively provided on different surfaces of the circuit board 131. In other words, the outer connection terminal 133 is provided on a front surface 131a of the circuit board 131 and the first and second inner connection terminals 134 and 135 are provided on a long side surface 131c adjacent to the front surface 131a. The long side surface 131c is a long side surface that is relatively longer than a short side surface having a short length.

The electrode assembly 110 is formed by interposing a separator 113 between first and second electrode plates 111 and 112 and winding them together in a jelly-roll type. The first electrode tab 114 is attached to the first electrode plate 111 and the second electrode tab 115 is attached to the second electrode plate 112.

The outer case 120 includes a first region 121 to receive the electrode assembly 110 and a second region 122 formed integrally with the first region 121. The second region 122 seals a portion of the first region 121 where the electrode assembly 110 is received.

After the second region 122 is combined in a state that the electrode assembly 110 is received in the first region 121, right and left sides and the front of the first and second regions 121 and 122 are thermally bonded in a pouch type case. In this time, the right and left sides and the front of the outer case 120 are thermally bonded so as to form side remaining parts 123 and 124 at the right and left sides and a front remaining part 125 is formed at the front thereof.

More specifically, as shown in FIG. 4, the outer case 120 defines a recessed space 147 in the first region 121 that is sized so as to receive the wound first and second electrode plates 111, 112 and separator 113. The recessed space 147 is surrounded by flanges or the side 123, 124 and upper 125 portions of the front remaining part. The tabs 114 and 115 are preferably coupled to the electrodes 111, 112 at a lateral location on the cell body and the cell body is sized so that when the cell body is positioned within the recessed space 147, the tabs 114, 115 are positioned outside of the recessed space 147 so as to extend upward generally adjacent to and a parallel to an upper portion 125 the front remaining part. Subsequently, as shown in FIG. 3, the outer portion 122 of the front remaining part can be bent upwards so that the electrodes 114, 115 is interposed between outer portion 122 and the upper portion 125 of the front remaining part. The side portions 123, 124 can then be bent backwards in the manner shown in FIG. 1 so as to surround the recessed space in the first region.

The protection circuit module 130 includes a circuit board 131. A plurality of electrical elements 132 are installed on the circuit board 131. In addition, the outer connection terminal 133 and first and second inner connection terminals 134 and 135 are provided on the circuit board 131.

The circuit board 131 includes relatively wide front and rear surfaces 131a and 131b and four side surfaces 131c and 131d that connect the front and rear surfaces 131a and 131b. The side surfaces include the long side surface 131c having a relatively long length and the short side surface 131d having a relatively short length.

The outer connection terminal 133 is provided on the front surface 131a. The outer connection terminal 133 is a terminal that transmits current of the battery to the outside and is different from the first and second inner connection terminals 134 and 135 connected to the first and second electrode tabs 114 and 115.

The first and second inner connection terminals 134 and 135 are provided on the long side surface 131c. The first and second inner connection terminals 134 and 135 include the first inner connection terminal 134 connected to the first electrode tab 114 and the second inner connection terminal 135 connected to the second electrode tab 115.

The electrical element 132 is installed on the rear surface 131b underneath the electric device that is mounted on the protection circuit module 130.

The circuit board 131 is provided at the upper portion 125 front remaining part of the outer case 120. More specifically, the upper surface 143 of the recess 147 that receives the bare cell defines a receiving surface 143 upon which the protection circuit 130 can be placed. In this location, the electrode tables 114, 115 can contact the inner connection terminals 134 and 135 in the manner shown in FIG. 2. Further, the protection circuit 130 is partially enclosed by the upper portion 125 and the side portions 123, 124 of the front remaining part, which define a recess 145, in the manner shown in FIG. 2. Accordingly, the outer connection terminal 133 is exposed to the outside of the lithium polymer battery and the first and second inner connection terminals 134 and 135 face the first and second electrode tabs 114 and 115 in parallel with each other. The electrical element 132 is generally not exposed to the outside.

The outer connection terminal 133 is electrically coupled to the first and second inner connection terminals 134 and 135.

In the lithium polymer battery 100 having the above construction, the protection circuit module 130 is provided at the front remaining part 125 of the outer case 120. In this time, it is desirable that the circuit board 131 of the protection circuit module 130 is formed in thickness to occupy the recess 145 positioned above the surface 143 and adjacent the upper portion 125 of the front remaining part of the outer case 120.

The circuit board 131 is provided in the recess 145 of the outer case 120 in the direction that the outer connection terminal 133 is exposed to the outside. The connection terminals 133, 134 are adjacent a side of the recess 145 so as to be substantially co-planar with the electrode tabs 114 and 115. Accordingly, the first and second inner connection terminals 134 and 135 provided on the long side surface 131c of the circuit board 131 are contacted to the first and second electrode tabs 114 and 115.

In addition, a substrate holder 140 may be further provided between the circuit board 131 and outer case 120 in the recess 145. When the substrate holder 140 is provided, the thickness of the circuit board 131 may be formed as thin as the thickness of the substrate holder 140.

When the circuit board 131 is provided as described above, the first and second electrode tabs 114 and 115 can be welded to the first and second inner connection terminals 134 and 135 while the electrode tabs are not bent or the amount of bending can be substantially reduced or even possibly eliminated.

In addition, after the first and second electrode tabs 114 and 115 are welded to the first and second inner connection terminals 134 and 135, it is less necessary to perform additional process of bending the first and second electrode tabs 114 and 115 because the outer connection terminal 133 is exposed to the outside of the lithium polymer battery.

As described above, according to the protection circuit module 130 of the embodiment, mechanical and electrical coupling works between terminals are completed by providing the circuit board 131 in the outer case 120 and welding them easily.

A lithium polymer battery according to another exemplary embodiment of the present invention will be explained below.

Figure 5:
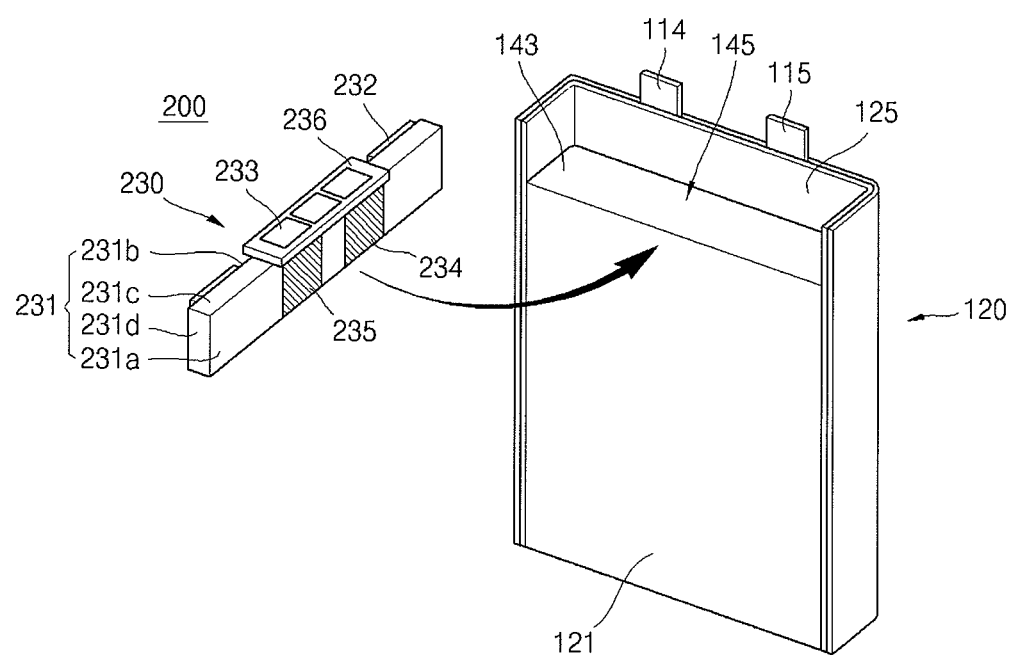
FIG. 5 is an exploded perspective view illustrating a lithium polymer battery according to another exemplary embodiment of the present invention.
Figure 6:
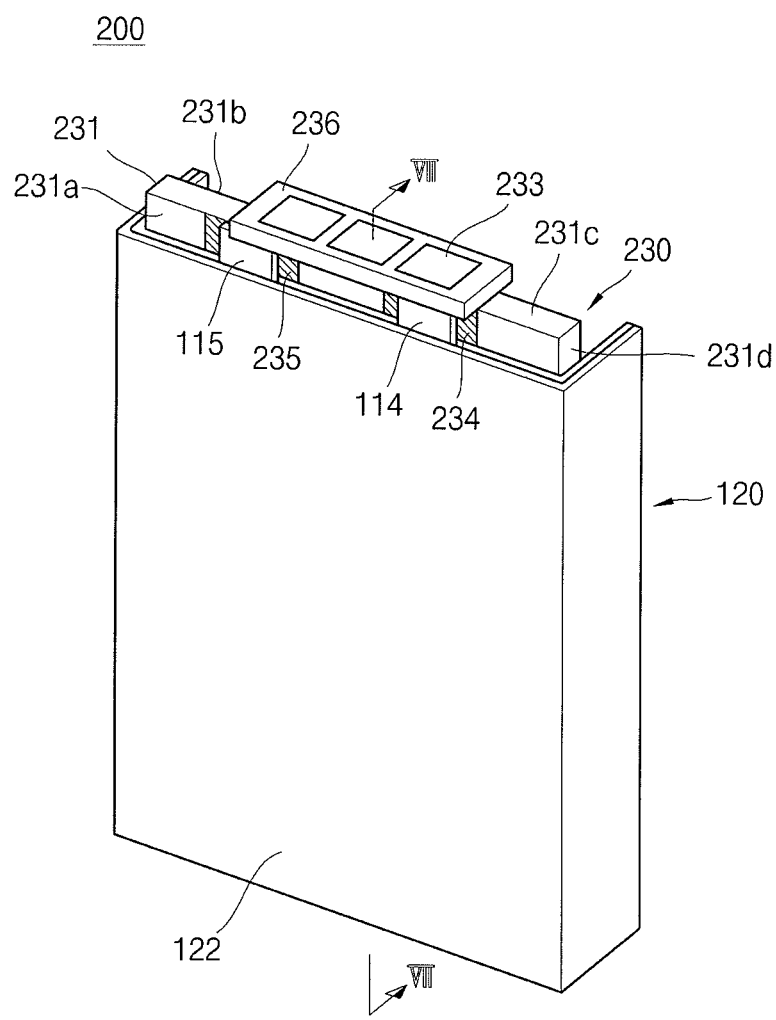
FIG. 6 is a perspective view illustrating an assembled state of the lithium polymer battery according to another exemplary embodiment.
Figure 7:
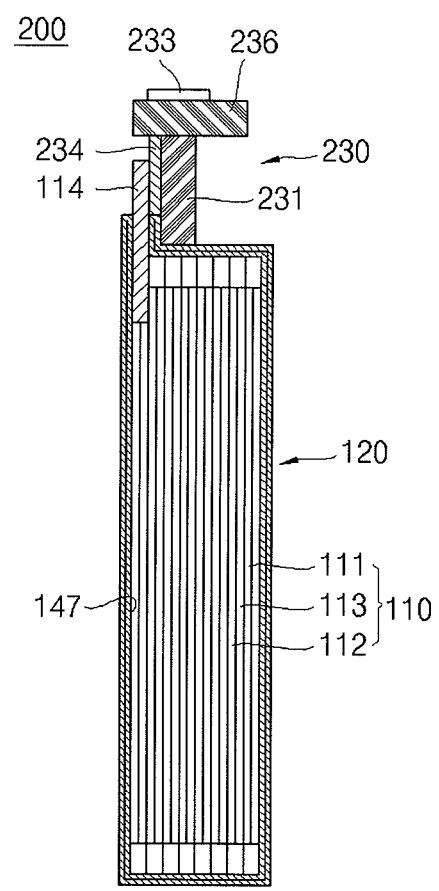
FIG. 7 is a sectional view taken along 'VII-VII' line of FIG. 6.

FIG. 5 is an exploded perspective view illustrating a lithium polymer battery according to another exemplary embodiment of the present invention and FIG. 6 is a perspective view illustrating an assembled state of the lithium polymer battery according to another exemplary embodiment and FIG. 7 is a sectional view taken along 'VII-VII' line of FIG. 6.

Referring to FIGS. 5 to 7, a lithium polymer battery 200 includes an electrode assembly 110, a roughly cubic outer case 120 receiving the electrode assembly 110 and a protection circuit module 230 electrically coupled to the electrode assembly 110 in the outer case 120.

The protection circuit module 230 includes a circuit board 231 and a terminal housing 236.

The terminal housing 236 is provided with an outer connection terminal 233 and the circuit board 231 is provided with first and second inner connection terminals 234 and 235. The first and second inner connection terminals 234 and 235 provided on the circuit board 231 are parallel to the withdrawn direction of the first and second electrode tabs 114 and 115 of the outer case 120.

The circuit board 231 and terminal housing 236 are combined in perpendicular to each other. The first and second inner connection terminals 234 and 235 are provided on a front surface 231a of the circuit board 231 and the terminal housing 236 is provided on a long side surface 231c adjacent to the front surface 231a. Here, the long side surface 231c is a long side surface having a relatively long length. Therefore, the outer connection terminal 233 provided on the terminal housing 236 is provided in perpendicular to the first and second inner connection terminals 234 and 235.

Constructions of the electrode assembly 110 and outer case 120 are the same as the above embodiment. Thus, the same drawing reference numerals are used for the same members and detailed explanation will be omitted.

As discussed above, the outer case 120 defines a recess 147 that receives the bare cell or electrode assembly of the battery with the electrode tabs 114, 115 extending upward therefrom so as to be positioned proximate a upper portion 125 flange of the outer case 120. The outer portion 122 of the case 121 can then be folded towards the recess 147 leaving the electrode tabs 114, 115 interposed between the outer portion 122 and the upper portion 125 in the manner shown in FIG. 7. Further, the protection circuit 230 is positioned on the surface 143 within the recess 145 defined by the upper portions 125, and the side portions 123 and 124 in the manner shown in FIGS. 6 and 7.

As described above, the protection circuit module 230 includes the circuit board 231 and terminal housing 236. A plurality of electrical elements 232 are installed on the rear surface 231b of the circuit board 231. In addition, the first and second inner connection terminals 234 and 235 are provided on the front surface 231a. In addition, the outer connection terminal 233 is provided on the upper surface of the terminal housing 236.

The circuit board 231 includes the front and rear surfaces 231a and 231b and four side surfaces 231c and 231d that connect the front and rear surfaces 231a and 231b. The side surfaces include the long side surface 231c having a relatively long length and the short side surface 231d having a relatively short length.

The circuit board 231 is provided at the front remaining part 125 of the outer case 120 in a stood-up state.

Accordingly, the first and second inner connection terminals 234 and 235 are contacted to the first and second electrode tabs 114 and 115 with facing each other. The terminal housing 236 is provided at the long side surface 231c of the circuit board 231 and thus the outer connection terminal 233 is exposed to the outside of the lithium polymer battery.

The outer connection terminal 233 is electrically coupled to the first and second inner connection terminals 234 and 235.

In the lithium polymer battery having the above construction, the protection circuit module 230 is provided at the front remaining part 125 of the outer case 120. In other words, the circuit board 231 of the protection circuit module 230 is provided at the front remaining part 125 of the outer case 120 in the stood-up state.

Accordingly, the first and second inner connection terminals 234 and 235 of the circuit board 231 are contacted to the first and second electrode tabs 114 and 115 of the front remaining part 125 of the outer case 120. Therefore, the first and second electrode tabs 114 and 115 can be easily welded to the first and second inner connection terminals 234 and 235 without bending them.

In addition, the circuit board 231 is provided in the stood-up state and the outer connection terminal 233 is provided on the upper surface of the terminal housing 236 that is vertically combined to the circuit board 231. Accordingly, the outer connection terminal 233 is exposed to the outside of the lithium polymer battery. Thus, it is less necessary to perform additional process of bending the first and second electrode tabs 114 and 115.

As described above, the protection circuit module 230 additionally includes the circuit board 231 and the terminal housing 236 provided with the outer connection terminal 233, where the circuit board 231 is provided at the outer case 120 in the stood-up state. Thus, mechanical and electrical coupling works between terminals are completed by easy welding.

As described above, the lithium polymer battery according to the present invention produces the following effects.

The electrode tabs of the bare cell can be electrically coupled to the protection circuit module either without bending or with limited bending of the electrode tabs, thereby improving reliability and safety of the battery.

The electrode tabs of the bare cell can be coupled to the protection circuit module without bending or with limited bending, thereby reducing defects caused by disconnection occurring at the bent part of the electrode tabs.

The mechanical coupling work of the electrode tabs of the bare cell and connection terminals of the protection circuit module can be easily performed.

In other words, the electrode tabs of the bare cell are provided to face connection terminals of the protection circuit module, thereby improving assembling workability during welding process.

It should be understood by those of ordinary skill in the art that various replacements, modifications and changes in the form and details may be made therein without departing from the spirit and scope of the present invention as defined by the following claims. Therefore, it is to be appreciated that the above described embodiments are for purposes of illustration only and are not to be construed as limitations of the invention.

What is claimed is:

1. A lithium polymer battery, comprising:
an electrode assembly;
an outer case receiving the electrode assembly, where an electrode tab of the electrode assembly is separate from and extends beyond the outer case wherein the outer case defines a first surface and an upper portion extending outward from the first surface and wherein the electrode tab extends outward of the upper portion;
a protection circuit module provided at one side of the outer case adjacent the first surface, where an inner connection terminal of the protection circuit module is connected to the electrode tab of the electrode assembly outward from the upper portion and provided in parallel to the withdrawn direction of the electrode tab,
wherein the protection circuit module is provided at the upper portion;
and wherein the electrode tab is not bent.

2. The lithium polymer battery of claim 1, wherein the electrode assembly is formed by interposing a separator between first and second electrode plates and winding them together in a jelly-roll type and electrode tabs are respectively attached to the first and second electrode plates.

3. The lithium polymer battery of claim 1, wherein the outer case comprises a first region for receiving the electrode assembly and a second region combined to an open part of the first region, where right and left sides and the fronts of the first and second regions are thermally bonded so as to form side remaining parts and front remaining parts.

4. The lithium polymer battery of claim 3, wherein the electrode tab is vertically withdrawn out through the front remaining part of the outer case and the protection circuit module is provided at the front remaining part of the outer case.

5. The lithium polymer battery of claim 1, wherein the protection circuit module comprises a circuit board provided with the inner and outer connection terminals, where the inner connection terminal is electrically and mechanically connected to the electrode tab and the outer connection terminal transmits current to the outside by being electrically coupled to the inner connection terminal.

6. The lithium polymer battery of claim 5, wherein the inner and outer connection terminals are respectively provided at different surfaces of the circuit board.

7. The lithium polymer battery of claim 6, wherein the outer connection terminal is provided on the front surface of the circuit board and the inner connection terminal is provided on a long side surface adjacent to the front surface.

8. The lithium polymer battery of claim 1, wherein the protection circuit module comprises the circuit board and a terminal housing separated from the circuit board and the inner connection terminal is provided on the circuit board and the outer connection terminal electrically coupled to the inner connection terminal is provided at the terminal housing.

9. The lithium polymer battery of claim 8, wherein the circuit board is provided at the front remaining part of the outer case in a stood-up state and the terminal housing is provided at the long side surface of the circuit board.

10. The lithium polymer battery of claim 8, wherein the inner connection terminal is provided at the front surface of the circuit board.

\* \* \* \* \*